(12) United States Patent
Zhao et al.

(10) Patent No.: US 11,543,787 B2
(45) Date of Patent: Jan. 3, 2023

(54) NETWORKED CONTROL SYSTEM TIME-DELAY COMPENSATION METHOD BASED ON PREDICTIVE CONTROL

(71) Applicant: Qingdao University of Technology, Shandong (CN)

(72) Inventors: Jingbo Zhao, Shandong (CN); Bingxin Xue, Shandong (CN); Zhong Wang, Shandong (CN); Jingxuhui Zhu, Shandong (CN); Tengfei Qiu, Shandong (CN); Xinchao Liu, Shandong (CN)

(73) Assignee: Qingdao University of Technology, Shandong (CN)

( * ) Notice: Subject to any disclaimer, the term of this patent is extended or adjusted under 35 U.S.C. 154(b) by 464 days.

(21) Appl. No.: 16/745,581

(22) Filed: Jan. 17, 2020

(65) Prior Publication Data

US 2020/0241487 A1 Jul. 30, 2020
US 2021/0149349 A9 May 20, 2021

(30) Foreign Application Priority Data

Jan. 24, 2019 (CN) .......................... 201910068775.5

(51) Int. Cl.
*G05B 13/02* (2006.01)
*G06F 17/11* (2006.01)
(Continued)

(52) U.S. Cl.
CPC ....... *G05B 13/0285* (2013.01); *G05B 13/048* (2013.01); *G06F 17/11* (2013.01); *G06N 3/0436* (2013.01)

(58) Field of Classification Search
None
See application file for complete search history.

(56) References Cited

U.S. PATENT DOCUMENTS

2018/0260713 A1\* 9/2018 Liang ................... G06N 3/0454

OTHER PUBLICATIONS

Han, Chang-Wook, Duk-Guen Cha, and Hajime Nobuhara. "Time Delay Prediction of Networked Control Systems using Logic-based Fuzzy Neural Networks." SCIS & ISIS SCIS & ISIS 2008. Japan Society for Fuzzy Theory and Intelligent Informatics, 2008. (Year: 2008).\*

(Continued)

*Primary Examiner* — Carlos R Ortiz Rodriguez
(74) *Attorney, Agent, or Firm* — Renner, Otto, Boisselle & Sklar, LLP

(57) ABSTRACT

The present invention discloses a networked control system (NCS) time-delay compensation method based on predictive control. The method comprises the following steps: (1) acquiring random time-delay data in an NCS, and preprocessing the data; (2) predicting the current time-delay by using a fuzzy neural network (FNN) optimized by a particle swarm optimization (PSO) algorithm; (3) compensating the predicted time-delay by using an implicit proportional-integral-based generalized predictive control (PIGPC) algorithm; (4) determining whether a preset work end time is up according to a clock in the NCS; if yes, ending the process; if no, returning to step (2). The method disclosed by the present invention can accurately predict and effectively compensate the NCS time-delay and has excellent development prospect.

5 Claims, 5 Drawing Sheets

(51) Int. Cl.
*G06N 3/04* (2006.01)
*G05B 13/04* (2006.01)

(56) References Cited

OTHER PUBLICATIONS

Yang, Yin, Bu LePing, and Li Hong Ke. "Research on networked predictive functional controller based on Particle Swarm Optimization." 2015 Chinese Automation Congress (CAC). IEEE, 2015. (Year: 2015).*

Tian, Zhong-Da, et al. "Networked control system time-delay compensation based on time-delay prediction and improved implicit GPC." Algorithms 8.1 (2015): 3-18. (Year: 2015).*

Tian, Zhong-Da, et al. "Time-delay compensation method for networked control system based on time-delay prediction and implicit PIGPC." International Journal of Automation and Computing 12.6 (2015): 648-656. (Year: 2015).*

* cited by examiner

NETWORKED CONTROL SYSTEM TIME-DELAY COMPENSATION METHOD BASED ON PREDICTIVE CONTROL

TECHNICAL FIELD

The present invention relates to the field of a networked control system (NCS), and in particular to an NCS time-delay compensation method based on predictive control.

BACKGROUND

A networked control system (NCS) is a closed-loop feedback control system in which actuators, sensors and controllers exchange signals through a network. The insertion of the network in the control loop makes the analysis of an NCS complex, especially induced time-delay in the network can impose severe influence on the system performance. At present, there is no method capable of accurately predicting and effectively compensating time-delay of the NCS.

SUMMARY

To solve the above technical problem, the present invention provides an NCS time-delay compensation method based on predictive control to achieve an objective of accurately predicting and effectively compensating time-delay of an NCS. Therefore, the NCS time-delay compensation method based on predictive control has excellent development prospect.

To achieve the above objective, the present invention adopts the following technical solution:

an NCS time-delay compensation method based on predictive control comprises the following steps:

(1) acquiring random time-delay data in an NCS, and pre-processing the data;

(2) predicting the current time-delay by using a fuzzy neural network (FNN) optimized by a particle swarm optimization (PSO) algorithm;

(3) compensating the predicted time-delay by using an implicit proportional-integral-based generalized predictive control (PIGPC) algorithm;

(4) determining whether a preset work end time is up according to a clock in the NCS; if yes, ending the process; if no, returning to step (2).

In the technical solution, step (1) specifically comprises: collecting a group of continuous random time-delay data; utilizing first five time-delay values as an input sample 1 and a sixth time-delay value as an output sample 1 to form a first sample pair, then utilizing second to sixth time-delay values as an input sample 2 and a seventh time-delay value as an output sample 2 to form a second sample pair, by such analogy, forming 300 sample pairs as data for training the FNN.

In the technical solution, optimization of the FNN by the PSO algorithm at step (2) is: optimizing a connection weight and a membership function of the FNN by using the PSO algorithm, that is, setting elements of a position vector $x_i$ of a particle swarm to be expectation and standard deviation of the connection weight and the membership function of the FNN. Such optimization specifically comprises the following steps:

1), randomly initializing a position and a velocity of each particle, and determining parameters including population size, inertia weight and acceleration factor;

2), calculating a fitness value of each initial particle, wherein $p_i$ is the optimal position of the current particle, and $p_g$ is the optimal position of the particle swarm;

3), updating the position and the velocity of each particle according to formulae (5) and (6), and iterating to generate a new particle;

wherein mathematical expressions of the PSO algorithm are:

$$v_{id}(t+1)=wv_{id}(t)+c_1r_1(p_{id}-x_{id}(t))+c_2r_2(p_{gd}-x_{id}(t)) \quad (5)$$

$$x_{id}(t+1)=x_{id}(t)+v_{id}(t+1) \quad (6)$$

In the expressions, i is the number of particles, i=1, 2, ..., m; d is a space dimension, d=1, 2, ..., D; t is time; w is the inertia weight and a nonnegative number; $c_1$ and $c_2$ are acceleration factors and are defined as constants; $r_1$ and $r_2$ are random numbers and are uniformly distributed between 0 and 1; $p_{id}$ is the optimal position of a particle i; $p_{gi}$ is the optimal position of a particle swarm; $x_{id}(t)$ is the position of the particle i at the time t, $x_{id}(t+1)$ is the position of the particle i at the time t+1, and $x_{id}(t) \in [-x_{max}, x_{max}]$; $v_{id}(t)$ is the velocity of the particle i at the time t, $v_{id}(t+1)$ is the velocity of the particle i at the time t+1, and $v_{id}(t) \in [-v_{max}, v_{max}]$; $x_{max}$ and $v_{max}$ are nonnegative numbers;

4), returning to step 2), and stopping iteration till the convergence criterion is met, wherein a global extremum is an optimal solution of a training problem.

In the technical solution, step (2) specifically comprises: inputting the $301^{st}$ to $305^{th}$ time-delay values as the input sample into the optimized FNN to obtain a first prediction value of network time-delay; then inputting the $302^{nd}$ to $306^{th}$ time-delay values as the input sample into the optimized FNN to obtain a second prediction value of the network time-delay; by such analogy, completing prediction on the network time-delay.

In the technical solution, the convergence criterion at step 4) is: a threshold of a fitness function is 0.001, and the fitness function is as follows:

$$f = \frac{1}{N_s}\sum_{i=1}^{N_s}(Y_i - y_i) \quad (7)$$

In the formula, $N_s$ is the number of training set samples, $Y_i$ is an expected output, and $y_i$ is an actual output.

In the technical solution, step (3) specifically comprises: according to the implicit PIGPC algorithm, obtaining a controller increment $\Delta u(k)$ when the time-delay exists, further obtaining a control value $u(k)$, and finally transmitting the optimal control value $u(k)$ to an actuator.

According to the above technical solution, the NCS time-delay compensation method based on predictive control provided by the present invention predicts the random time-delay by utilizing the FNN optimized by the PSO, and then compensates the time-delay by utilizing the implicit PIGPC algorithm. Simulation results show: the time-delay prediction accuracy of the FNN optimized by the PSO algorithm is higher than that of the FNN optimized by the traditional backpropagation (BP) algorithm; the implicit PIGPC algorithm has better time-delay compensation effect in comparison with the implicit GPC algorithm; calculation time is shortened; the present invention is more suitable for actual use.

BRIEF DESCRIPTION OF THE DRAWINGS

To describe the technical solutions in the embodiments of the present invention or the prior art more clearly, following briefly introduces the accompanying drawings required for describing the embodiments or the prior art.

DESCRIPTION OF THE EMBODIMENTS

The following clearly and completely describes the technical solutions in the embodiments of the present invention with reference to the accompanying drawings in the embodiments of the present invention.

The present invention provides an NCS time-delay compensation method based on predictive control. The method can accurately predict and effectively compensate NCS time-delay and has excellent development prospect.

1 FNN Optimized by the PSO Algorithm 1.1 FNN Model

An FNN is a product by combining fuzzy set theory and a neural network. The FNN not only has massive parallel processing capacity, self learning ability and adaptive ability of the neural network, but also can process fuzzy information and achieve a fuzzy inference function so as to have excellent performance.

Figure 1:
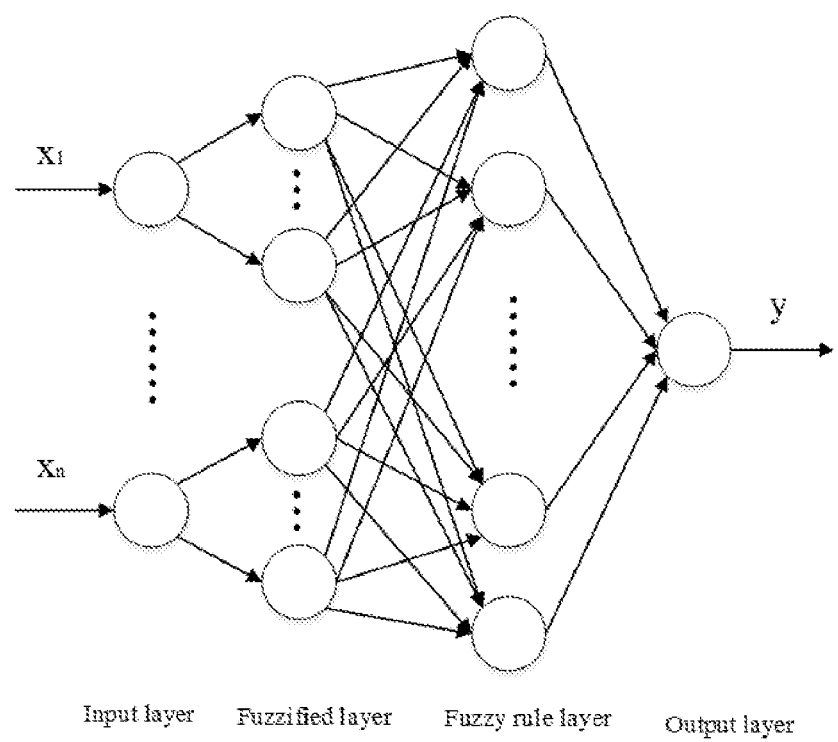
FIG. 1 is a structural diagram of an FNN.

An FNN prediction model is a multiple-input single-output four-layer network model, as shown in FIG. 1. The four layers respectively are an input layer, a fuzzified layer, a fuzzy rule layer and an output layer.

The first layer is the input layer. The number of neurons of the input layer is the same as the number of input variables. An input vector is $x=(x_1, x_2, \ldots, x_n)^T$. y is a variable of the output layer. An output variable is a future time-delay predicted value and only one, so the output layer only has one neuron. The $j^{th}$ fuzzy rule of a system can be expressed as follows:

$$R_j: \text{if } x_1=X_{1j}, x_2=X_{2j}, \ldots, x_n=X_{nj}, \text{ then } y=Y_j \qquad (1)$$

In the formula, $Y_j$ is a result of the $j^{th}$ rule, and j is decided by the number of the neurons of the fuzzy rule layer; $X_{ij}$ is a fuzzy subset corresponding to the input variables, i=1, 2, ..., n, and j is decided by the number of the fuzzy subsets of each input variable.

The second layer is the fuzzified layer for calculating a membership degree of each input variable. By utilizing a normal distribution function as the membership function, a calculation formula that the $i^{th}$ input variable meets the fuzzy subset $X_j i$ is as follows:

$$\mu_{X_{ij}}(x_i) = \exp\left[-\frac{(x_i - m_{ij})^2}{\sigma_{ij}^2}\right] \qquad (2)$$

In the formula, $m_{ij}$ is an expectation of the normal distribution function, $\sigma_{ji}$ is a standard deviation, and the membership of the input variable is completely decided by the parameters $m_{ij}$ and $\sigma_{ji}$.

The third layer is the fuzzy rule layer. In the design, connection weights of the fuzzified layer and the fuzzy rule layer are defined as follows according to the fuzzy set theory:

$$\mu_j = \mu_{X_{1j}}(x_1) \times \mu_{X_{2j}}(x_2) \times \ldots \times \mu_{X_{nj}}(x_n) = \exp\left[-\sum_{i=1}^{n}\frac{(x_i - m_{ij})^2}{\sigma_{ij}^2}\right] \qquad (3)$$

In the formula, $\mu_{X_{ij}}(x_i)$ is a membership degree of the input variable $x_i$ to the fuzzy subset $X_{ji}$.

The third layer and the fourth layer of the FNN complete a fuzzy decision making function. If supposing a system has m rules, the design conducts a defuzzifying by using a weighing average method to obtain an output as follows:

$$y = \frac{\sum_{j=1}^{m} w_j \mu_j}{\sum_{j=1}^{m} \mu_j} \qquad (4)$$

In the formula, $w_j$ is the connection weight between the fuzzy rule layer and the output layer.

To train the FNN, parameters to be determined comprises the expectation $m_{ij}$ and the standard difference $\sigma_{ji}$ of the normal distribution function as well as the connection weight $w_j$. The neural network commonly uses a gradient descent algorithm. Such algorithm has a low speed of convergence, is easy to generate a local optimization problem, and is hard to obtain a global optimal solution. To solve this problem, the present invention optimizes parameters of the FNN by using the PSO algorithm having the global optimization performance.

1.2 PSO Algorithm 1.2.1 Mathematical Description of a PSO Algorithm

If an objective is searched in a certain D-dimensional space, a swarm consists of m particles. Each particle in the swarm has its position, the position of an $i^{th}$ particle is represented by $x_i=(x_{i1}, x_{i2}, \ldots x_{iD})$, i=1, 2, ..., m, and the velocity of the $i^{th}$ particle is a D-dimensional vector and is represented by $v_i=(v_{i1}, v_{i2}, \ldots, v_{iD})$. When each particle passes through a new position, the new position is compared with all positions through which the particle passes previously. After the $i^{th}$ particle flies to a certain position, an optimal position through which the $i^{th}$ particle passes is $p_i=(p_{i1}, p_{i2}, \ldots, p_{iD})$. The positions through which all particles in the swarm pass are compared to obtain optimal positions through which all particles pass, and the optimal positions are represented by $p_g=(p_{g1}, p_{g2}, \ldots, p_{gD})$. Each particle changes the position according to the following formulae:

$$v_{id}(t+1) = wv_{id}(t) + c_1 r_1 (p_{id} - x_{id}(t)) + c_2 r_2 (p_{gd} - x_{id}(t)) \qquad (5)$$

$$x_{id}(t+1) = x_{id}(t) + v_{id}(t+1) \qquad (6)$$

In the formulae, i is the number of particles, i=1, 2, ..., m; d is a space dimension, d=1, 2, ..., D; t is time; w is an inertia weight and a nonnegative number; $c_1$ and $c_2$ are acceleration factors and are defined as constants; $r_1$ and $r_2$ are random numbers and are uniformly distributed between 0 and 1; $p_{id}$ is the optimal position of a particle i; $p_{gi}$ is the optimal position of a particle swarm; $x_{id}(t)$ is the position of the particle i at the time t, $x_{id}(t+1)$ is the position of the particle i at the time t+1, and $x_{id}(t) \in [-x_{max}, x_{max}]$; $v_{id}(t)$ is the velocity of the particle i at the time t, $v_{id}(t+1)$ is the velocity of the particle i at the time t+1, and $v_{id}(t) \in [-v_{max}, v_{max}]$; $x_{max}$ and $v_{max}$ are nonnegative numbers.

1.2.2 Flow Chart of the PSO Algorithm

Figure 2:
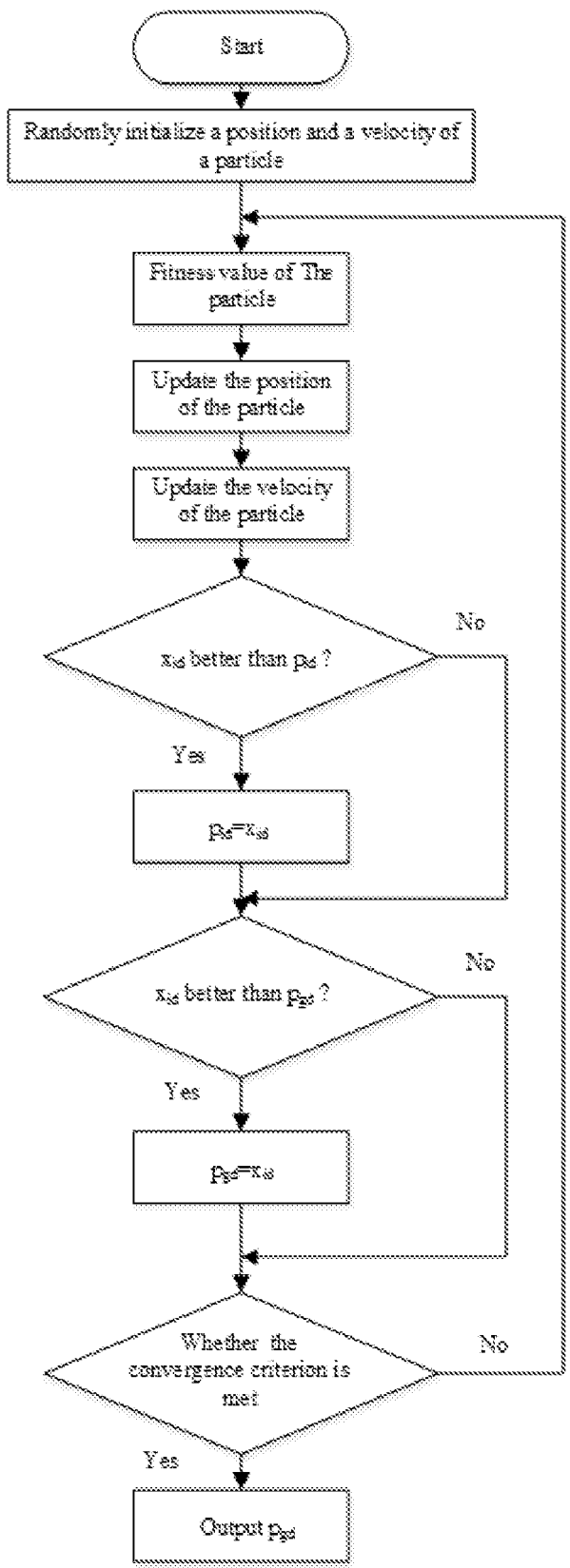
FIG. 2 is a flow chart of a PSO algorithm.

A flow chart of the PSO algorithm is shown in FIG. 2. The position and the velocity of a particle are randomly initialized; a fitness value of the particle is calculated; the position and the optimal position of the particle are compared and judged whether to meet the convergence criterion; if yes, the position of the particle is outputted to be the optimal position of the particle swarm; if no, the position and the velocity of the particle are updated, and iteration is continued.

1.2.3 Steps for Optimizing a Fitness Function and Parameters

A connection weight and a membership function of the FNN are optimized by using the PSO algorithm, that is, elements of a position vector $x_i$ of a particle swarm are set to be expectation and standard deviation of the connection weight and the membership function of the FNN. The training of the FNN is mainly used for making a parameter error in the network minimum, so the fitness function can be defined as follows:

$$f = \frac{1}{N_s}\sum_{i=1}^{N_s}(Y_i - y_i) \tag{7}$$

In the formula, $N_s$ is the number of training set samples, $Y_i$ is an expected output, and $y_i$ is an actual output.

Parameter optimization by the PSO algorithm specifically comprises the following steps:

1), randomly initializing a position and a velocity of each particle, and determining parameters including population size, inertia weight and acceleration factor;

2), calculating a fitness value of each initial particle, wherein $p_i$ is the optimal position of the current particle, and $p_g$ is the optimal position of the particle swarm;

3), updating the position and the velocity of each particle according to formulae (5) and (6) to generate a new particle;

4), returning to step 2), and stopping iteration till the convergence criterion is met, wherein a global extremum is an optimal solution of a training problem.

2 Design of an NCS Controller Based on an FNN-PSO and an Implicit PIGPC Algorithm

Figure 3:
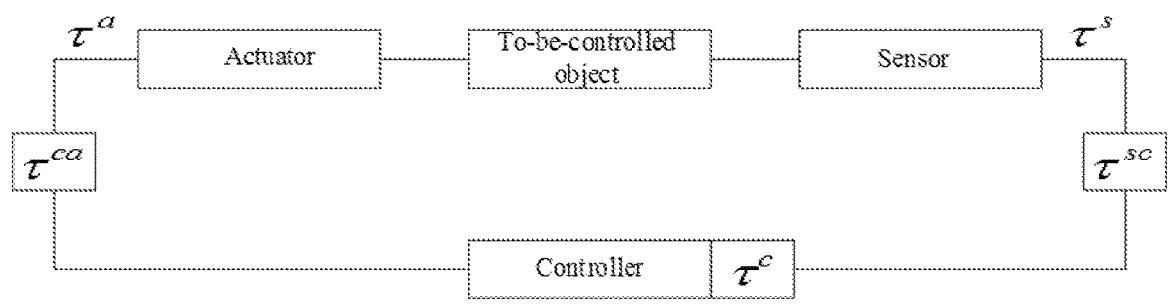
FIG. 3 is a structural diagram of NCS time-delay.

2.1 Implicit Proportional-Integral-Based Generalized Predictive Control (PIGPC) Algorithm The GPC algorithm needs to calculate the Diophantine equation and rolling inverse optimization so as to have long calculation time and low efficiency. However, the implicit GPC algorithm is improved based on the standard GPC algorithm, does not need to calculate the Diophantine equation and the like, but cannot immediately feed back and has low robustness. Therefore, based on the GPC algorithm and the implicit GPC algorithm, an implicit PIGPC algorithm is provided. The implicit PIGPC algorithm has the advantages of combining a feedback structure of a PI controller and a strong prediction function of the GPC algorithm and does not needs to calculate the Diophantine equation so as to have high efficiency and robustness, as shown in FIG. 3.

An objective function of the implicit GPC algorithm is:

$$J(k)=E\{\Sigma_{j=1}^{P}[e(k+j)]^2+\Sigma_{j=0}^{N_u-1}\lambda[\Delta u(k+j|k)]^2\} \tag{8}$$

wherein $e(k+j)=y_s(k+j)-y(k+j)$ represents an error between an expected value and an actual value.

Based on formula (8), an objective function of an implicit PIGPC algorithm is defined such that a proportional integral structure is provided as follows:

$$J(k)=E\{\Sigma_{j=1}^{P}[K_p[\Delta e(k+j)]^2+K_i[e(k+j)]^2]+\Sigma_{j=0}^{N_u-1}\lambda[\Delta u(k+j|k)]^2\} \tag{9}$$

wherein $K_p \geq 0$ represents a proportion factor, and $K_i \geq 0$ represents an integral factor.

By considering a to-be-controlled object, a CARIMA model is utilized for description, and can be represented as:

$$A(z^{-1})y(k) = B(z^{-1})u(k-1) + \frac{c(z^{-1})\xi(k)}{\Delta} \tag{10}$$

wherein $z^{-1}$ represents a backshift operator corresponding to an amount of a backward sensor sampling cycle, and is expressed by a formula: $z^{-1}y(k)=y(k-1)$, $z^{-1}u(k)=u(k-1)$; A, B, C are polynomial of $z^{-1}$; $B(z^{-1})$ may represent a time lag of the to-be-controlled object; to an $m_1$ time lag system, $b_0 \sim b_{m_1-1}=0$, $m \geq m_1$; a leading element can be zero, but cannot all be zero; $\Delta$ represents a difference operator, and $\Delta=1-z-1$; $\xi(k)$ represents a random white noise; $u(k-1)$, $y(k)$ respectively represents input and output of a control system to provide the principle and method of the GPC, if supposing $C(z^{-1})=1$, a pulse transfer function between the input u and the output y of the control system is as follows:

$$G(z^{-1}) = \frac{z^{-1}B(z^{-1})}{A(z^{-1})} \tag{11}$$

$C(z^{-1})=1$ is substitute into the formula (10), the following can be obtained:

$$A(z^{-1})y(k) = B(z^{-1})u(k-1) + \frac{\xi(k)}{\Delta} \tag{12}$$

An output prediction model at the k+j time is as follows:

$$A(z^{-1})y(k+j) = B(z^{-1})u(k+j-1) + \frac{\xi(k+j)}{\Delta} \tag{13}$$

To solve a predicted output value when a system outputs y(k+j|k) at k+j time, the following Diophantine equation is considered:

$$1=E_j(z^{-1})A(z^{-1})\Delta+z^{-j}F_j(z^{-1}) \tag{14}$$

$$G_j(z^{-1})=E_j(z^{-1})B(z^{-1})=\tilde{G}_j(z^{-1})+z^{-j}H_j(z^{-1}) \tag{15}$$

A prediction output at k+j time is as follows:

$$\bar{y}(k+j|k)=\tilde{G}_j(z^{-1})\Delta u(k+j-1|k)+H_j(z^{-1})\Delta u(k-1)+F_j(z^{-1})y(k)$$

if $f(k+j)=H_j(z^{-1})\Delta u(k-1)+F_j(z^{-1})y(k)$, a prediction output at the k+j time can also be represented as follows:

$$\bar{y}(k+j|k)=\tilde{G}_j(z^{-1})\Delta u(k+j-1|k)+f(k+j) \tag{16}$$

A predicted value $\bar{y}(k+j|k)$ takes the place of an actual output value y(k+j), so an error equation e(k+j) is:

$$e(k+j)=y_s(k+j)-\tilde{G}_j(z^{-1})\Delta u(k+j-1|k)-f(k+j) \tag{17}$$

An error increment $\Delta e(k+j)$ is defined as:

$$\Delta e(k+j)=[\Delta y_s(k+j)-\Delta f(k+j)]-[\tilde{G}_j(z^{-1})\Delta u(k+j-1|k)-\tilde{G}_{j-1}(z^{-1})\Delta u(k+j-2|k)] \tag{18}$$

The formulae (17) and (18) are substituted into the objective function $J(k)=E\{\Sigma_{j=1}^{P}[K_p[\Delta e(k+j)]^2+K_i[e(k+j)]^2]+\Sigma_{j=0}^{N_u-1}\lambda[\Delta u(k+j|k)]^2\}$, and if $$\frac{\partial J}{\partial \Delta u} = 0,$$

the following can be obtained:

$$\Delta u(k) = (\lambda I + K_p G_p^T G_p + K_i G_i^T G_i)^{-1} [K_p G_p^T (\Delta y_s(k) - \Delta f(k)) + K_i G_i^T (y_s(k) - f(k))] \quad (19)$$

$$G_i = \begin{bmatrix} g_0 & 0 & 0 & 0 & 0 \\ g_1 & g_0 & 0 & 0 & 0 \\ g_2 & g_1 & g_0 & 0 & 0 \\ \vdots & \ddots & \ddots & \ddots & 0 \\ g_{p-1} & g_{p-2} & g_{p-3} & \cdots & g_0 \end{bmatrix} \text{ wherein}$$

$$G_p = \begin{bmatrix} g_0 & 0 & 0 & 0 & 0 \\ g_1 - g_0 & g_0 & 0 & 0 & 0 \\ g_2 - g_1 & g_1 - g_0 & g_0 & 0 & 0 \\ \vdots & \ddots & \ddots & \ddots & 0 \\ g_{p-1} - g_{p-2} & g_{p-2} - g_{p-3} & g_{p-3} - g_{p-5} & \cdots & g_0 \end{bmatrix}$$

$$R_p = (\lambda I + K_p G_p^T G_p + K_i G_i^T G_i)^{-1} K_p G_p^T \; R_i = (\lambda I + K_p G_p^T G_p + K_i G_i^T G_i)^{-1} K_i G_i^T$$

So, the control increment $\Delta u(k)$ can be represented as:

$$\Delta u(k) = R_p \Delta E(k) + R_i E(k) \quad (20)$$

wherein $\Delta E(k) = \Delta y_s(k) - \Delta f(k)$, $E(k) = y_s(k) - f(k)$, so a control value of the PIGPC is as follows:

$$u(k) = u(k-1) + R_p \Delta E(k) + R_i E(k) \quad (21)$$

A control law of the PI controller is $$\bar{u}(k) = P(k) + I(k) = K_p \bar{e}(k) + (I(k-1) + K_i \bar{e}(k)) \quad (22)$$

$$\bar{u}(k-1) = K_p \bar{e}(k-1) + I(k-1) \quad (23)$$

By subtracting the formula (23) from the formula (22), the following is obtained:

$$\Delta \bar{u}(k) = K_p \Delta \bar{e}(k) + K_i \bar{e}(k) \quad (24)$$

A control value of the PI controller is:

$$\bar{u}(k) = \bar{u}(k-1) + K_p \Delta \bar{e}(k) + K_i \bar{e}(k) \quad (25)$$

By comparing the formula (21) with the formula (25), it can be seen that the both have the same form, the PI controller and the implicit GPC algorithm are combined to obtain the structure of the implicit PIGPC controller.

$$\text{If } S = \begin{bmatrix} 1 & & & & \\ -1 & 1 & & & \\ & -1 & 1 & & \\ & & \ddots & \ddots & \\ & & & -1 & 1 \end{bmatrix}, G_p = SG_i, \Delta y_s(k) = Sy_z(k), \Delta f(k) = Sf(k).$$

Therefore, a control increment of the implicit PIGPC can be represented as:

$$\Delta u(k) = (\lambda I + K_p G_i^T S^T S G_i + K_i G_i^T G_i)^{-1} [K_p G_i^T S^T (Sy_s(k) - Sf(k)) + K_i G_i^T (y_s(k) - f(k))] \quad (26)$$

If $\Omega = K_i I + K_p S^T S \Delta u(k)$, $\Delta u(k)$ can be represented as:

$$\Delta u(k) = (\lambda I + G_i^T \Omega G_i)^{-1} G_i^T \Omega (y_s(k) - f(k)) \quad (27)$$

Compared with the GPC algorithm, there is no additional calculation, and the Diophantine equation and the matrix inversion do not need to be calculated for many times. Compared with the implicit GPC algorithm, PI control with the feedback structure is added, so, the efficiency is improved, and the algorithm is also optimized.

2.2 Design of Time-Delay Compensation Controller Based on an FNN-PSO and an Implicit PIGPC Algorithm The key of a time-delay compensation strategy research is: the current network time-delay cannot be measured. The current time-delay is predicted by selecting a proper prediction method with the aid of historical data and future input.

Figure 4:
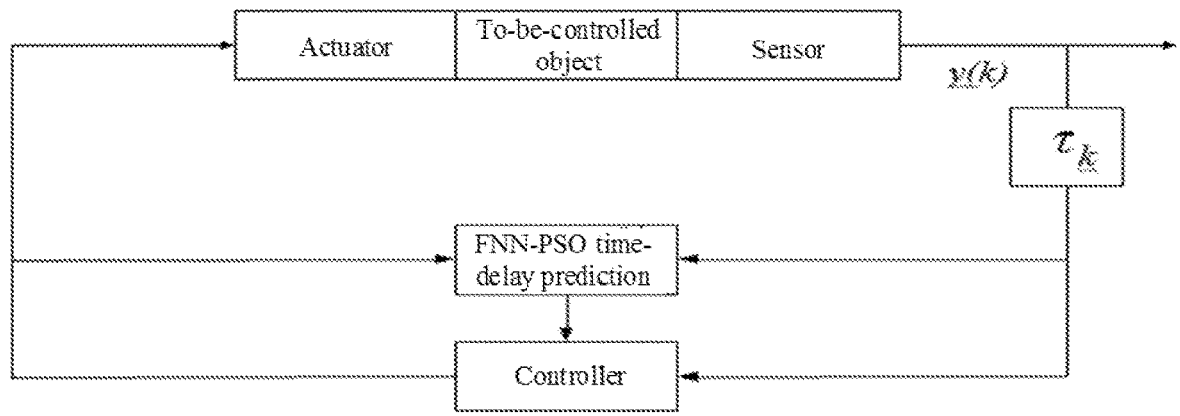
FIG. 4 is a diagram of a time-delay compensation controller based on an FNN-PSO and an implicit PIGPC algorithm.

FIG. 4 shows a structure of a time-delay compensation controller based on the FNN-PSO and the implicit PIGPC The time-delay compensation strategy is implemented generally by the following steps:

(1) acquiring time-delay in the past time, and processing the past data;

(2) predicting the current time-delay according to the past data and the future input by using the FNN-PSO;

(3) obtaining a controller increment $\Delta u(k)$ according to the implicit PIGPC algorithm, further obtaining a control value $u(k)$, and finally transmitting the optimal control value $u(k)$ to an actuator;

(4) determining whether a preset work end time is up; if yes, ending the process; if no, returning to step (2).

3 Prediction Model Building and Simulation Analysis 3.1 Prediction Model Building Prediction of the network time-delay utilizes a rolling prediction method. First five time-delay values are utilized as an input sample 1, and a sixth time-delay value is utilized as an output sample 1 to form a first sample pair; second to sixth time-delay values are utilized as an input sample 2, and a seventh time-delay value is utilized as an output sample 2 to form a second sample pair; by such analogy, 300 sample pairs are formed to be utilized as data for training the FNN.

Then the $301^{st}$ to $305^{th}$ time-delay values as the input sample and the input vector are inputted into the trained FNN to obtain a first prediction value of network time-delay; then the $302^{nd}$ to $306^{th}$ time-delay values as the input sample are inputted into the optimized FNN to obtain a second prediction value of the network time-delay; by such analogy, 20 network time-delay predicted values are obtained.

Figure 5:
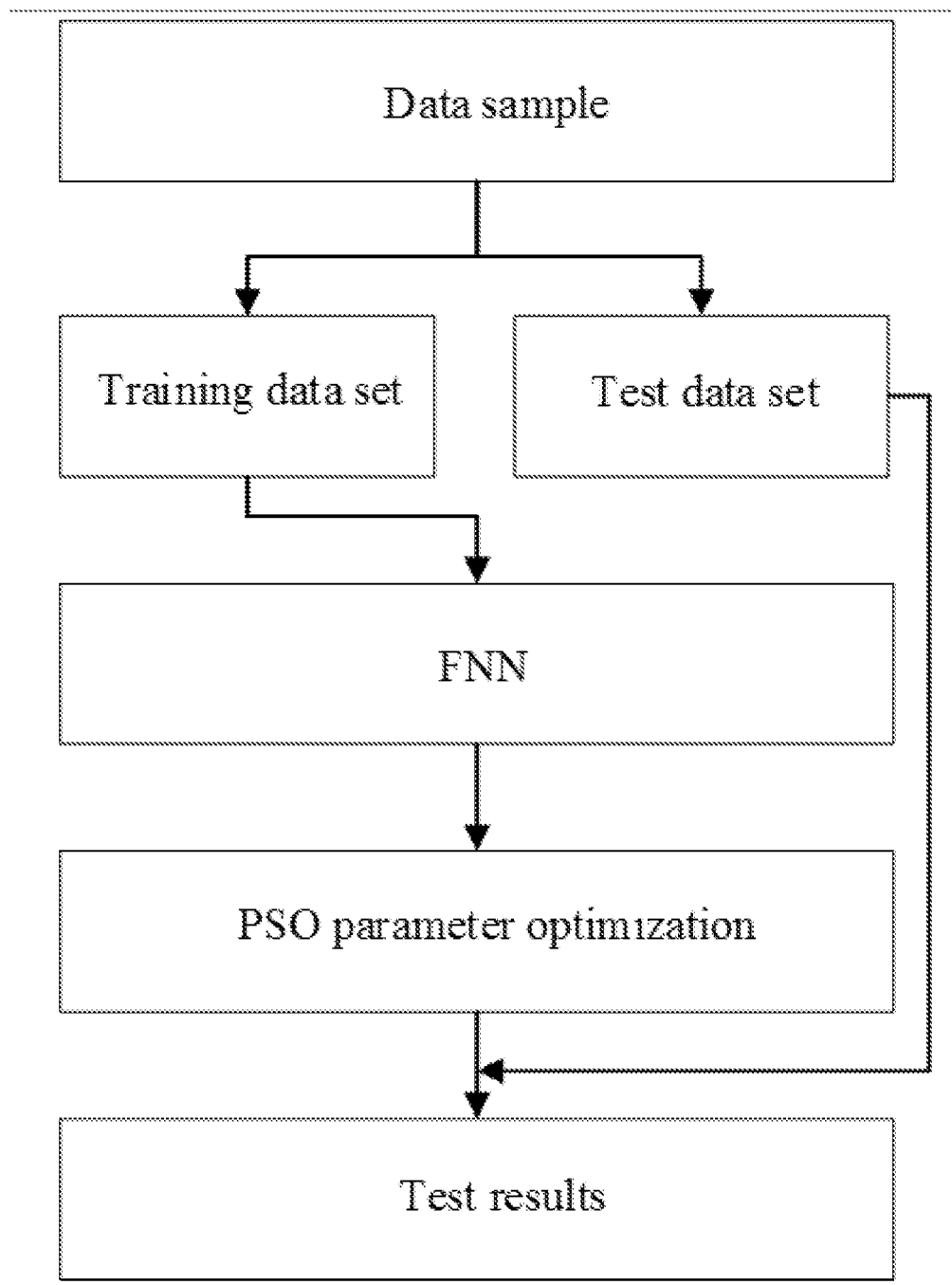
FIG. 5 is a prediction flow chart.

FIG. 5 shows a prediction flow chart. Modeling steps are as follows:

(1) building and training an FNN: determining a structure of a neural structure by using a clustering algorithm, selecting the number of fuzzy memberships by utilizing a Kohonen network, determining that each input variable is divided into two fuzzy subsets, so that the structure of the FNN is 5-10-32-1; next training the FNN by using the training data;

(2) optimizing network parameters: initializing the PSO algorithm, and setting the population size to be 30, the acceleration factor to be $c_1 = c_2 = 2$, the fitness threshold to be 0.001 and the maximum allowable iteration times to be 350;

(3) predicting the model: verifying the model by using test data and obtaining a final prediction result.

3.2 Simulation Results and Discussion

Figure 6:
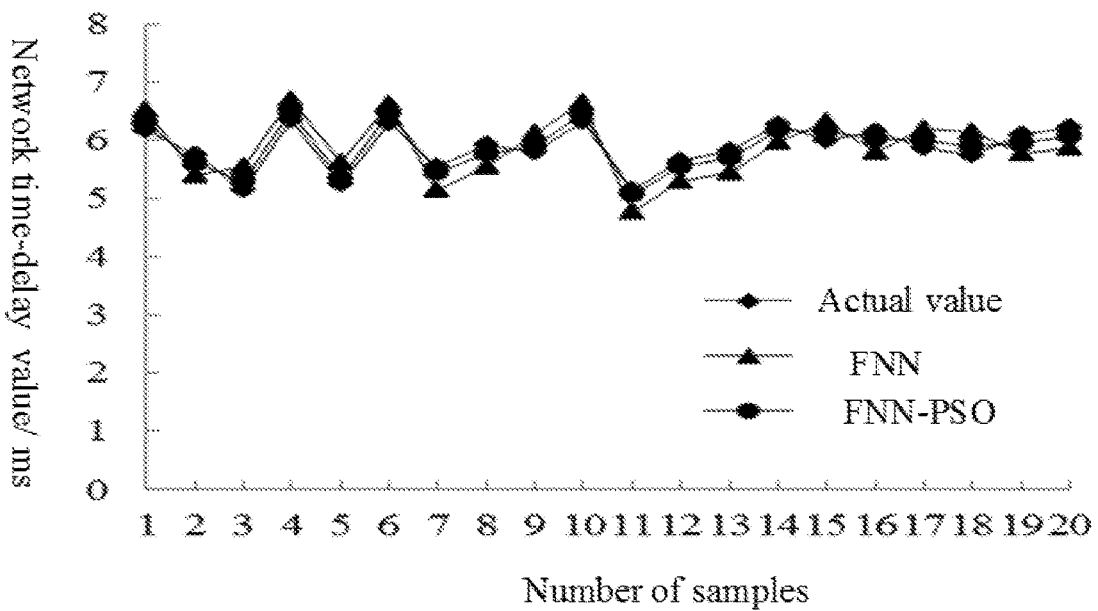
FIG. 6 is a performance comparison diagram of an FNN and an FNN-PSO.

Two types of the FNNs are constructed. One type of the FNN utilizes the gradient descent algorithm to train the FNN while the other type of the FNN utilizes the PSO algorithm to train the FNN. FIG. 6 shows performance comparison of the two types of the FNNs.

According to FIG. 6, it can be intuitively seen that the prediction model of the FNN optimized by the PSO algorithm has better fitting ability to the actual data.

To verify effectiveness of the time-delay compensation algorithm, a direct current servo system is selected as the to-be-controlled object $$G(s) = \frac{1000}{s(s+1)}$$

Figure 7:
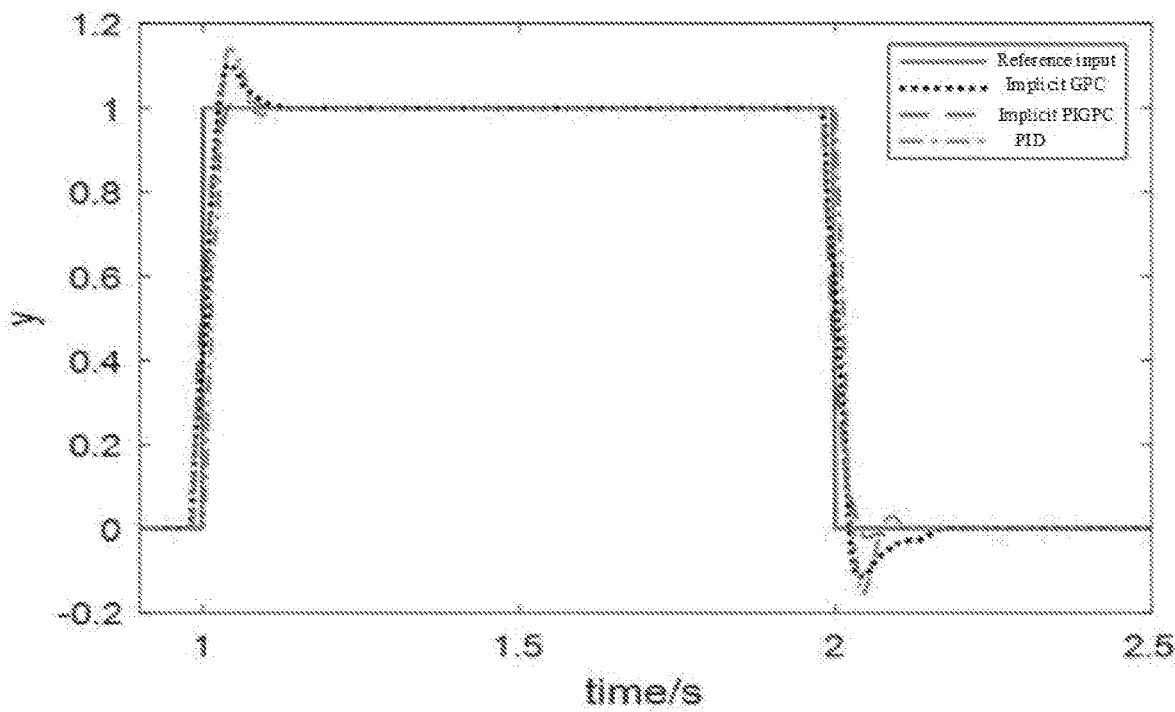
FIG. 7 is an output diagram of time-delay compensation.

The type of the network selects Ethernet, the sampling period is 20 ms and the transmission rate is 80000 bits/s. The system adds turbulence nodes such that the network generate a load. The time-delay prediction utilizes the FNN optimized by the PSO. FIG. 7 shows tracking effects of the implicit PIGPC in combination with the time-delay prediction algorithm and the implicit GPC to input square wave signals. As shown in FIG. 7, the implicit PIGPC in combination with the time-delay prediction algorithm can greatly track the reference signal in comparison with the implicit GPC and is further suitable for actual use.

The above illustration of the disclosed embodiments can enable a person skilled in the art to implement or practice the present invention. Various modifications to these embodiments are readily apparent to a person skilled in the art, and the generic principles defined herein may be practiced in other embodiments without departing from the spirit or scope of the present invention. Thus, the present invention is not limited to the embodiments shown herein but falls within the widest scope consistent with the principles and novel features disclosed herein.

What is claimed is:

1. A networked control system (NCS) time-delay compensation method based on predictive control, comprising the following steps:
   (1) acquiring random time-delay data in an NCS, and preprocessing the data;
   (2) predicting the current time-delay by using a fuzzy neural network (FNN) optimized by a particle swarm optimization (PSO) algorithm;
   (3) compensating the predicted time-delay by using an implicit proportional-integral-based generalized predictive control (PIGPC) algorithm;
   (4) determining whether a preset work end time is up according to a clock in the NCS; if yes, ending the process; if no, returning to step (2);
   wherein step (1) includes: collecting a group of continuous random time-delay data; utilizing first five time-delay values as an input sample 1 and a sixth time-delay value as an output sample 1 to form a first sample pair; utilizing second to sixth time-delay values as an input sample 2 and a seventh time-delay value as an output sample 2 to form a second sample pair; by such analogy, forming 300 sample pairs as data for training the FNN.

2. The NCS time-delay compensation method based on predictive control according to claim 1, wherein optimization of the FNN by the PSO algorithm at step (2) is: optimizing a connection weight and a membership function of the FNN by using the PSO algorithm, that is, setting elements of a position vector $x_i$ of a particle swarm to be expectation and standard deviation of the connection weight and the membership function of the FNN; such optimization specifically comprises the following steps:

1), randomly initializing a position and a velocity of each particle, and determining parameters including a population size, an inertia weight and an acceleration factor;
   2), calculating a fitness value of each initial particle, wherein $p_i$ is the optimal position of the current particle, and $p_g$ is the optimal position of the particle swarm;
   3), updating the position and the velocity of each particle according to formulae (5) and (6), and iterating to generate a new particle;
   wherein mathematical expressions of the PSO algorithm are:

$$v_{id}(t+1) = wv_{id}(t) + c_1 r_1 (p_{id} - x_{id}(t)) + c_2 r_2 (p_{gd} - x_{id}(t)) \quad (5)$$

$$x_{id}(t+1) = x_{id}(t) + v_{id}(t+1) \quad (6)$$

in the expressions, i is the number of particles, i=1, 2, ..., m; d is a space dimension, d=1, 2, ..., D; t is time; w is the inertia weight and a nonnegative number; $c_1$ and $c_2$ are acceleration factors and are defined as constants; $r_1$ and $r_2$ are random numbers and are uniformly distributed between 0 and 1; $p_{id}$ is the optimal position of a particle i; $p_{gi}$ is the optimal position of a particle swarm; $x_{id}(t)$ is the position of the particle i at the time t, $x_{id}(t+1)$ is the position of the particle i at the time t+1, and $x_{id}(t) \in [-x_{max}, x_{max}]$; $v_{id}(t)$ is the velocity of the particle i at the time t, $v_{id}(t+1)$ is the velocity of the particle i at the time t+1, and $v_{id}(t) \in [-v_{max}, v_{max}]$; $x_{max}$ and $v_{max}$ are nonnegative numbers;
   4), returning to step 2), and stopping iteration till the convergence criterion is met, wherein a global extremum is an optimal solution of a training problem.

3. The NCS time-delay compensation method based on predictive control according to claim 1, wherein step (2) specifically comprises: inputting the $301^{st}$ to $305^{th}$ time-delay values as the input sample into the optimized FNN to obtain a first prediction value of network time-delay; then inputting the $302^{nd}$ to $306^{th}$ time-delay values as the input sample into the optimized FNN to obtain a second prediction value of the network time-delay; by such analogy, completing prediction on the network time-delay.

4. The NCS time-delay compensation method based on predictive control according to claim 2, wherein the convergence criterion at step 4) is: a threshold of a fitness function is 0.001, and the fitness function is as follows:

$$f = \frac{1}{N_s} \sum_{i=1}^{N_s} (Y_i - y_i) \quad (7)$$

in the formula, $N_s$ is the number of training set samples, $Y_i$ is an expected output, and $y_i$ is an actual output.

5. The NCS time-delay compensation method based on predictive control according to claim 1, wherein step (3) specifically comprises: according to the implicit PIGPC algorithm, obtaining a controller increment $\Delta u(k)$ when the time-delay exists, further obtaining a control value $u(k)$, and finally transmitting the optimal control value $u(k)$ to an actuator.

\* \* \* \* \*